G. SIPPERT.
WINDMILL REGULATOR.
APPLICATION FILED DEC. 4, 1914.
1,158,393.
Patented Oct. 26, 1915.
2 SHEETS—SHEET 1.
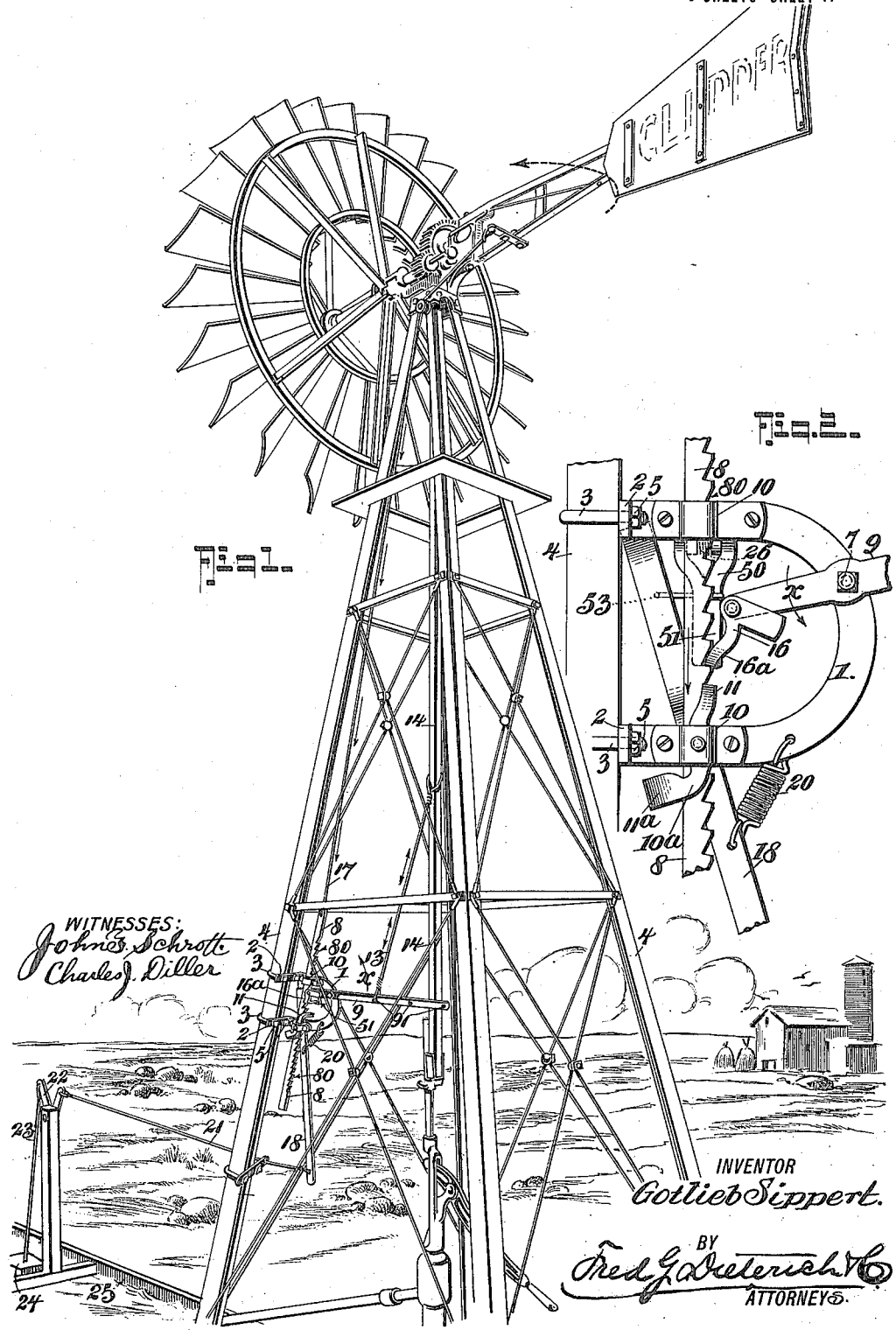
INVENTOR
Gotlieb Sippert.
BY
Fred G. Dieterich & Co.
ATTORNEYS.

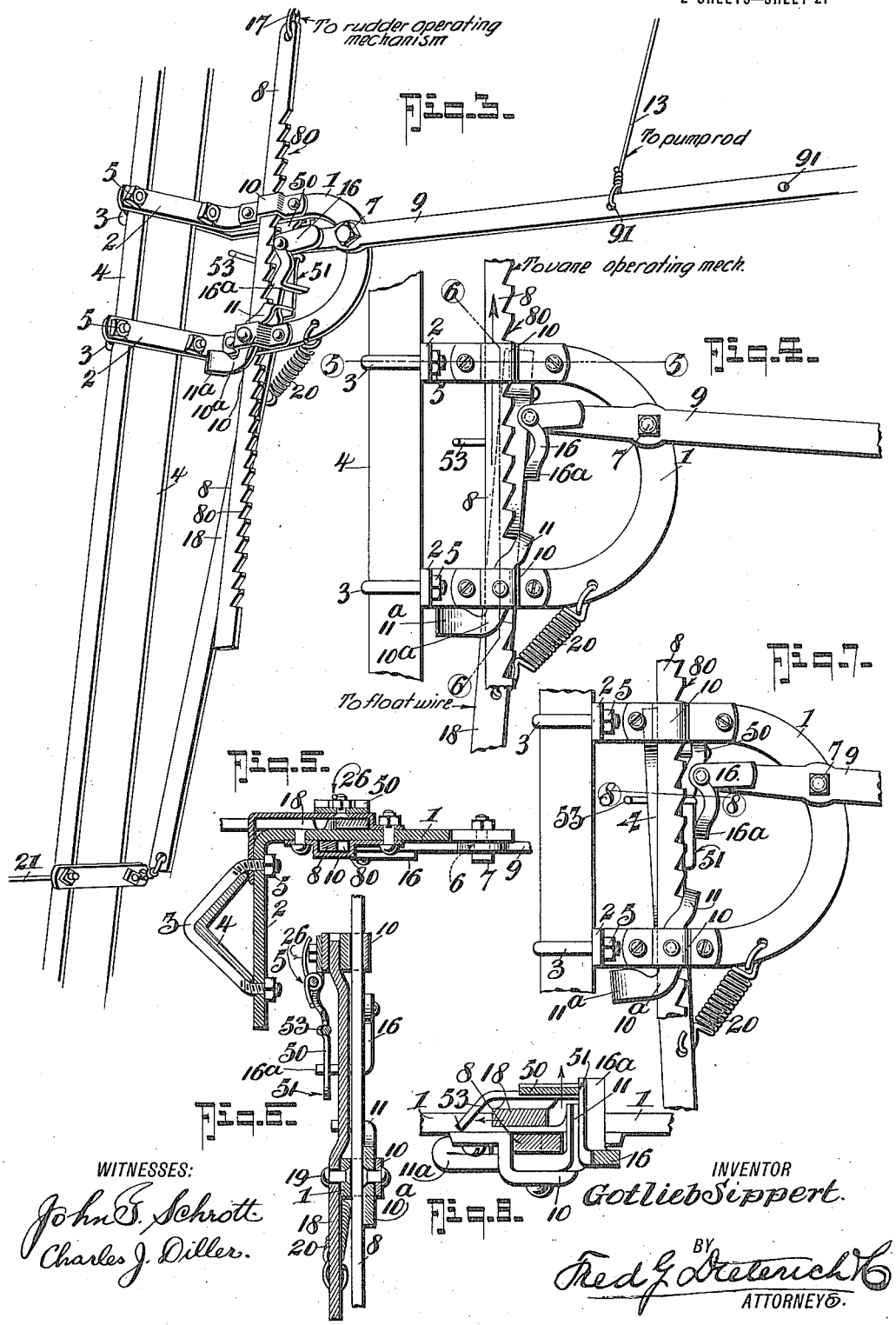

UNITED STATES PATENT OFFICE.

GOTLIEB SIPPERT, OF BOWDLE, SOUTH DAKOTA.

WINDMILL-REGULATOR.

1,158,393.   Specification of Letters Patent.   Patented Oct. 26, 1915.

Application filed December 4, 1914. Serial No. 875,499.

*To all whom it may concern:*

Be it known that I, GOTLIEB SIPPERT, residing at Bowdle, in the county of Edmunds and State of South Dakota, have invented a new and Improved Windmill-Regulator, of which the following is a specification.

My invention has reference to attachments for wind mills especially designed for automatically regulating the pumping operation of the mill and my said invention primarily has for its purpose to provide a simple and inexpensive mechanism that may be readily attached to the ordinary types of wind mills and in which the operating parts are so constructed whereby they may be connected with a float in the tank or trough into which the water is pumped and the pump rod, so that when the tank is empty, the regulator lets the mill into the wind, and under the pumping action the rudder of the mill is gradually turned to throw the mill out of the wind after the trough or tank is filled.

My invention in its generic nature embodies a rack bar connectible with the wind wheel pendently supported from the wheel and held to move freely upwardly as the wheel is projected into the wind, a detent for holding the rack from upward movement, an oscillatable lever that connects with the pump rod and oscillates as the said rack reciprocates, and which carries a pawl device that engages with the rack to intermittently move it in a downward direction to effect a gradual moving of the mill out of the wind; a float controlled lever for throwing the said detent and pawl out of action at predetermined times, and supplemental means for holding the said pawl device out of an operative position without affecting the position of said detent and rack bar at predetermined times.

In its more specific nature, my invention embodies certain details of construction and novel combination of parts, all of which will be hereinafter fully explained, specifically pointed out in the appended claims and illustrated in the accompanying drawings, in which:

Figure 1 is a perspective view of my invention, so much of a wind mill being shown as is necessary to illustrate the practical application of my invention, the operative parts of my invention being shown in position for effecting the gradual turning off of the wind mill rudder during the operation of pumping. Fig. 2 is a detail elevation of my device as positioned in Fig. 1 and showing how the rack bar is gradually moved down to turn the wheel rudder around so that the mill will be "out of the wind." Fig. 3 is a perspective view of my improved attachment, the parts being so positioned as when the water tank float is down, so that the rack bar may be disengaged from the holding pawls and allow the wind wheel rudder to be thrown around by the wind so as to commence pumping. Fig. 4 is an elevation of the parts as positioned in Fig. 2. Figs. 5 and 6 are sections on the line 5—5 and 6—6 respectively on Fig. 4. Fig. 7 is a view similar to Fig. 4, showing the pawl disengaging bar gradually returning to its normal position, as when the water tank float is up, and also showing the top pawl as being yet held from engagement with the rudder actuating rack bar. Fig. 8 is an enlarged section on the line 8—8 on Fig. 7.

My improved wind mill regulating mechanism includes a supporting member in the nature of a U-shaped body 1, whose end members are bent at right angles to form clamping bars 2—2, each of which is suitably apertured to receive the threaded ends of clips 3 that secure the said body 1 to one of the standards 4 of the wind mill derrick or supporting frame, and the said clips are fixedly held on the said standard by the nuts 5—5, as shown.

The supporting member or body 1 is vertically mounted and at the outer or crown end, it has an aperture 6 that receives a bolt 7 that forms the pivot for an oscillatable lever 9 that connects with the pump rod in the manner presently explained.

8 designates what I term, a shiftable rack bar, one edge of which has ratchet teeth 80 arranged as shown in the drawing. Rack bar 8 is vertically slidable in keepers 10—10 mounted on Fig. 3, by reference to which it will be also noticed that a dog $10^a$ is pivotally mounted on the lowermost keeper or guide 10, whose latch end 11 is normally swung against the ratchet teeth 80 by the counterpoise or weighted end $11^a$.

A wire cable or strand 13 is connected in either of a series of holes 91, in the outer end of the lever 9 and when the parts are operatively assembled, as in Figs. 1 and 2, the said cable or strand passes up to a suitable guide point on the derrick frame and connects with the pump rod 14, as is clearly shown.

16 denotes a pawl device that is pivotally mounted on the inner end of the lever 9 to swing in the vertical plane and the said device includes a pendent member having an angled finger 16ª that rides upon the toothed face of the rack bar 8 and when the parts are positioned as shown on Figs. 1 and 2, each up movement of the pump rod causes the lever 9 to oscillate in the direction of arrows *x* and in consequence causes the pawl device to engage the rack bar teeth and move the said bar downwardly the distance of one tooth.

17 designates a wire cable or strand, one end of which is connected to the upper end of the rack bar and the other end connects with the wind wheel rudder closing means that operate to intermittently move the rudder to the closed position, as the rack bar is intermittently pulled down by the action of the oscillatable lever 9, operated by the pump rod during the pumping action, it being understood that in practice the several parts are relatively so arranged that the final closure of the wheel rudder does not take place until the tank 25, into which the water is delivered from the pump, is full.

18 designates another lever that is fulcrumed on the pivot bolt 19 oppositely to where the dog 10ª is pivoted and the said lever is pendently projected from the supporting body or frame 1, and held swung out to its normal or inoperative position (see Fig. 1) by the coiled spring 20 that joins with the lever 18 and the frame 1, as shown.

21 designates a wire strand or cable that is connected to the lower end of the lever 18 to a bell crank lever 22 mounted on a standard adjacent to the tank or trough and 23 is a wire connection that joins the said bell crank 22 with the float 24, in the tank.

By reason of the peculiar construction and the combination of the parts, so far as described, it will be readily understood that when the tank is emptied the tank float pulls the lever 18 over to the position shown in Fig. 3, and in doing so the upper end of the said lever swings inwardly toward and over the rack bar and engages the dogs 10ª and 16ª and holds them out of engagement with the teeth of the rack bar, and the latter being now free to slide is pulled up as the rudder opens out under the wind pressure, thus automatically setting the mill toward and in condition for operating the pump. As the capacity of the tank 25 nears fullness, the float 24 rises and allows lever 18 to recede from contact with dogs 16ª and 10ª so that they may presently engage the teeth of rack bar 8 and effect a gradual turning of the rudder out of the wind.

That the wind wheel rudder may not be swung out of the wind too soon to cause a premature stopping of the pumping action before the tank 25 is full, the pawl 16ª of the lever 9 must be held away from the teeth 80 of the rack bar 8 until the tank is full and for such purpose a deflector device is mounted on the upper part of the frame 1 to catch the pawl 16ª as the bar 18 moves toward the left in Fig. 7, thus holding pawl 16ª away from the rack bar 8 until the water tank is entirely full and the bar 18 is over to its extreme position, as in Fig. 2.

The deflector device consists of a plate 50 hinged to the upper arm of the frame 1, and pendent from such arm with its inner edge 51 projected beyond the inner or toothed edge of the rack bar. Plate 50 is normally held outwardly or away from close proximity with the pawl 16ª, as in Fig. 2, by lever 18, but when the lever 18 is returning to this position in Fig. 2, and is stationed, as in Fig. 7, at which time the tank is not entirely full of water, it is then that the pawl 16ª must be held away from engagement with bar 8 so that a premature turning around of the rudder above, as before explained, may not be effective. Plate 50 carries a laterally extended and inwardly bent finger 53 that projects in the path of movement of the upper end of the lever 18 and which is engaged by the said lever 18 as it moves back to the normal position (see arrow *z*) and by reason thereof the plate 50 is swung outwardly and held against the tension of its spring 26 so long as the lever 18 is held back in the position shown in Fig. 1, it being understood that when the plate 50 is swung outwardly, as stated, the pawl device on the lever 9 is free to engage the rack bar and move it down to bring the wind wheel rudder out of the wind.

From the foregoing description taken in connection with the accompanying drawings, the complete construction, the manner of operation and the advantages of my invention will be readily understood by those skilled in the art to which it appertains.

What I claim is:

1. A regulating mechanism for wind mills that comprises a reciprocably mounted rack bar adapted to be suspended from the mill to move upwardly as the mill opens into the wind, an oscillating lever connected with and actuated by the movement of the wind mill pump rod, a pawl on the lever for engaging the rack bar to intermittently move it downwardly to effect the moving of the mill out of the wind, a pivoted dog for holding the said rack bar from upward movement, means for simultaneously moving the pawl on the oscillating lever and the pivoted dog out of engagement with the rack bar, said means connecting with and actuated by the float in the wind mill tank, the said means including a single oscillating lever that engages the two pawls and spring held to its pawl disengaging position.

2. A regulating mechanism for wind mills comprising a supporting member adapted for being attached to the wind mill derrick, a rack bar vertically slidable on the said supporting member, connections for joining the upper end of the said bar to the wind wheel, a detent for holding the rack bar from said upward movement, a float controlled tripper for moving the detent to release the rack bar, connections for joining the tripper with the wind mill tank, a means mounted on the supporting member that engages with the rack bar for moving the said bar step-by-step in a downward direction and including connections that join with the wind mill pump, the aforesaid means also including a pivoted dog normally held for engaging the rack bar, a device on the supporting frame that normally projects in the plane of movement of the said pivoted dog to hold it out of engagement with the rack bar, and a connection between the said device and the float controlled detent tripper for holding the said device out of operative position when the rack bar is released.

3. In a wind mill regulating mechanism, the combination with the mill, the pump and the tank float; of means mounted on the mill derrick for regulating the mill, said means including a reciprocable rack bar, connections that join the bar with the mill that slide the bar upwardly as the mill opens into the wind, a detent for holding the bar from such movement, a lever device normally under tension to swing in one direction, connections that join the said lever and the tank float for swinging the said lever in the opposite direction to release the detent as the float drops, an oscillating lever, connections that join the lever with the pump rod for actuating the lever when the pump is operated, a pawl on the lever for engaging the rack bar to intermittently move the said bar in a direction to gradually move the wind mill into the wind, a member for holding said pawl out of the operative position at times, and means for operatively connecting said member and said lever device to render said member non-operative when the lever device is in its normal position.

4. In a wind mill regulating mechanism, the combination with the mill, the pump and the tank float; of a supporting member on the mill derrick, a rack bar slidably mounted on the said member, an oscillating lever pivotally mounted on the supporting member and connected to the pump rod, a gravity moved pawl on the end of the lever adapted for engaging the teeth of the rack bar to move the bar in the downward direction, a gravity held pawl mounted on the supporting member that normally swings to engage the rack bar to hold it from upward movement, a lever pivoted on the said supporting member normally spring held at an operative position, and a connection that joins the said lever with the float tank, and adapted when the float drops to swing the said lever to engage the two pawls that engage the rack bar and hold them free from the said bar.

5. In a wind mill regulating mechanism, a reciprocably mounted rack bar adapted to be suspended from the mill to move upwardly as the mill opens into the wind, an oscillating lever connected with and actuated by the movement of the wind mill pump rod, a pawl carried by said lever to engage said rack bar, and move it downwardly to effect the moving of the mill out of the wind, a pivoted dog for holding said rack bar against upward movement, a device tending to swing into the path of movement of said pawl and hold it out of engagement with said rack bar, and a float controlled means for throwing both said dog and said pawl out of engagement with said rack bar and for controlling the action of said device.

GOTLIEB SIPPERT.

Witnesses:
F. J. HAM,
JOHN LEWIS.

Copies of this patent may be obtained for five cents each, by addressing the "Commissioner of Patents, Washington, D. C."